J. L. BRANSON & A. JUERGENS.

Spring-Bottom for Beds.

No. 6,418. Reissued May 4, 1875.

Witnesses
Gustav Pafel
Charles Weber

Inventors.
Jesse L. Branson
A. August Juergens.

J. L. BRANSON & A. JUERGENS.

Spring-Bottom for Beds.

No. 6,418. Reissued May 4, 1875.

Witnesses:
Charles Weber
Gustav Pape

Inventors.
Jesse L. Branson
August Juergens.

J. L. BRANSON & A. JUERGENS.

Spring-Bottom for Beds.

Reissued May 4, 1875.

No. 6,418.

Witnesses

Gustav Pape

Charles Haber

Inventors.

Jesse L. Branson

August Juergens

UNITED STATES PATENT OFFICE.

JESSE L. BRANSON AND AUGUST JUERGENS, OF CINCINNATI, OHIO.

IMPROVEMENT IN SPRING-BOTTOMS FOR BEDS.

Specification forming part of Letters Patent No. 156,272, dated October 27, 1874; reissue No. 6,418, dated May 4, 1875; application filed February 23, 1875.

*To all whom it may concern:*

Be it known that we, JESSE L. BRANSON and AUGUST JUERGENS, both of Cincinnati, State of Ohio, have invented an Improved Metallic Spring for Beds, Chairs, Seats, &c., of which the following is a specification:

Our invention relates to metallic springs for beds, chairs, and seats of all kinds; and it consists in the combination of spirally-bent spring-tempered metal strips with metal supporting-straps, as more particularly hereinafter described.

Figure 1:
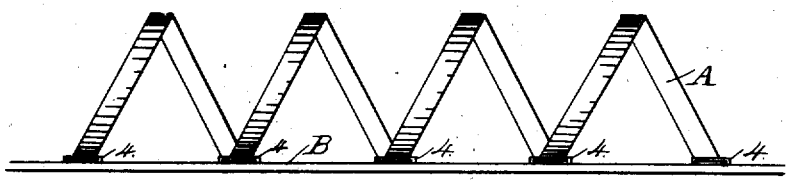
Figure 2:
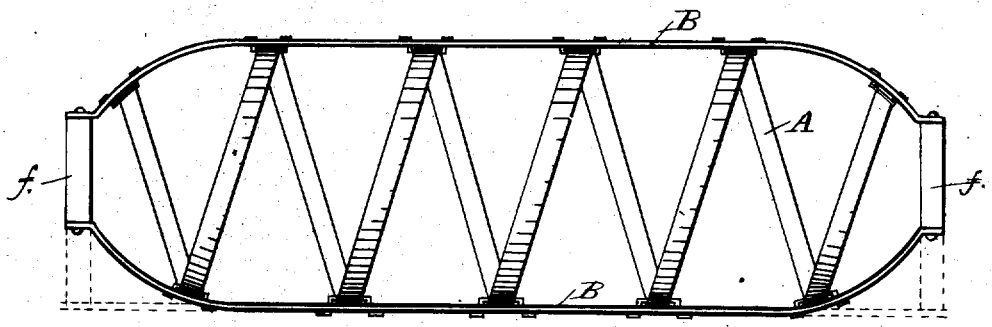
Figure 3:
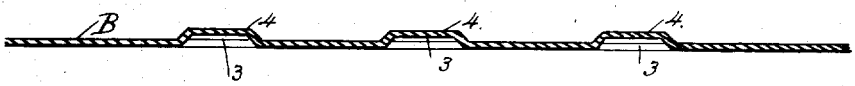
Figure 4:
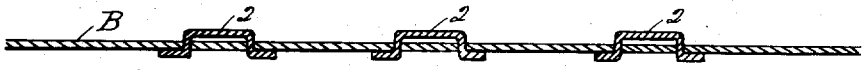
Figure 5:
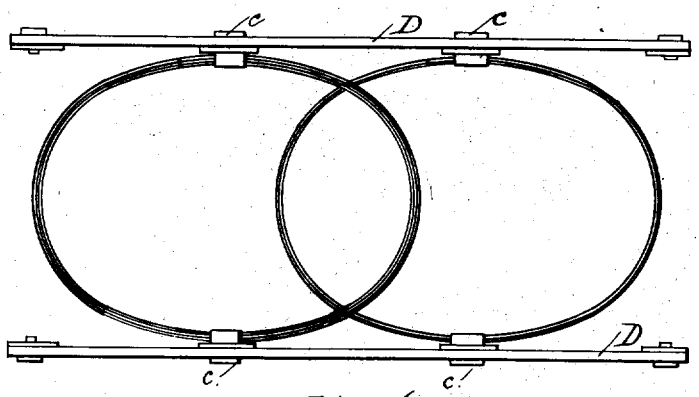
Figure 6:
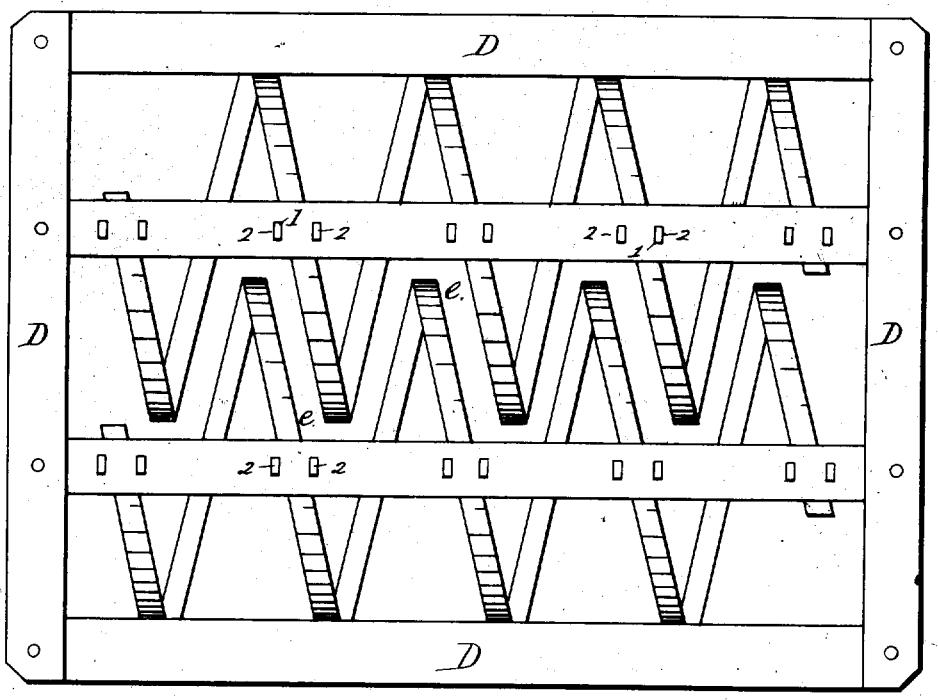

In the drawings, Figure 1 represents a spiral spring, secured to a straight strap of metal having loops formed therein; Fig. 2, a spiral spring secured by eyes to two opposite metal straps, whose ends are fastened to a section of a chair, lounge, or seat; Figs. 3 and 4, longitudinal sectional views of the straight straps and their loops or eyes; Figs. 5 and 6, an end view and a plan view of a metal frame having the coiled springs of three thicknesses; and Figs. 7 and 8, an end view and a plan of a wooden frame with our improved springs applied thereto, showing the spring under three conditions, viz., secured to a wooden bar and not compressed; secured to two metal straps and compressed, one of the straps being arched; and secured and compressed between two arched metal straps or transverse holding-pieces.

A is a flat strip or ribbon of tempered metal, bent or wound into a continuous spiral, as seen, the coils of the spring being more or less apart, according to circumstances. This strip we connect to a longitudinal metallic strap or holding-piece, B, at as many points of connection as may be necessary. Short parallel slits 1 1 are cut in the untempered metal strap B, and transversely of its length. In these slits are inserted short flat metal pieces or staples, 2, bent so as at their ends to be flat on the strap B, and at the center so as to form a flat loop to receive and secure a coil of the wire spring A, as seen. This construction allows the spring to be fastened in the act of coiling it, so that each coil may be secured as it in succession is bent from its straight form; or, if the loop be first inserted in the strap B, the strip which is to form the spiral may have its end successively threaded through one loop after the other in the act of coiling it; but this can be more easily and uniformly done by coiling the tempered strip around a cylinder of suitable size and length to admit of the proper spacing of the spiral coils. As each coil is formed at its proper place around the cylinder metal clasps or staples are placed across and underneath the tempered strip in a straight line along the cylinder with their ends outward, the coil resting between the points of such clasp or staples. The longitudinal strap B is then placed over the staples, and the points of the staples made to pass through the slits cut in the strap for the purpose, and their ends fastened down on the strap, thus thoroughly inclosing the coil in the staple, and fastening it to the strap. The entire spring is then slipped off of the cylinder, and is ready to be applied. In this condition the straight supporting-strap and its fastenings are all that prevent the spring A from springing back and resuming a straight position, and the coil until compressed retains a true cylindrical curvature, as shown at *x* in Fig. 8, and there is no set of the particles of the metal, such as takes place when iron or untempered metal is bent.

Another method of connecting the spring-coil to the straight or connecting strap is, by having two short parallel slits cut in it, but in the line of its length, such as seen at 3 in Fig. 3; then bending outward the parts embraced between the slits, thus forming a fixed loop, (see 4 4, Figs. 1 and 3,) and passing one end of the flat spring A through these loops successively, thus forming and securing the spring in the desired spiral shape and position.

Instead of connecting the continuous spring-coil to a single metal strap, it may, for some purposes, be connected to two such straps, placed opposite each other, as shown in Fig. 2, thus affording greater strength and power of resistance, and also the better adapting it for uses where the spring may be used either side up, as in cushions, beds, reversible seats, the foot-piece of a folding chair, &c.

It will be seen that the straps B serve the double purpose both of holding the coils to their places and also as a bed or rest for the spring, thus dispensing with any other crosspiece or webbing, which otherwise would be required for the latter purpose.

When both sides of the spring are to be used for reversible seats, folding beds, lounges, &c., the part *f* of the frame to which the ends of the straps B are to be fastened should be made narrow, to allow the ends of the straps to be brought quite close together, and the straps left equally loose on both sides, thus forming somewhat of an ellipse, between and by which the spring is held. It will be seen that this allows either side to become the bottom or support for the spring, while the opposite side may become the outer or spring side, with the strap sufficiently long to allow the spring to be depressed as much as is needed.

The coil in any and all cases may be made of one or more thicknesses of thin flat metal, as circumstances may require, to give strength with sufficient resilience.

The same construction, when made of larger dimensions, and with more spirals, makes an excellent spring bed-bottom.

For a bed-bottom, the lower series of metal straps, to which the spirals are secured, may be fastened to a rectangular frame or frames, D, as shown in Figs. 5 and 6; and, if desired, such frame may be placed, as seen in Fig. 5, on both sides of the spirals, or on one side only.

When our spring is to be used for a non-reversible seat, or for a back-piece, the strap on the back or lower side may be drawn tight and straight when fastened to the frame, thus forming a hard and level rest for the spring, as shown in dotted lines in Fig. 2, while the upper strap, being left purposely longer and looser, serves the purpose of giving greater strength and resistance to the spring, and at the same time takes the place of the twine or cord, which would otherwise be required for tying the springs down to the proper height, and for holding them in place, thus making a much more durable fastening, and at the same time leaving the surface much smoother and more even for upholstering upon.

The metal strap B, being flexible, is readily adaptable to conform itself to curved or irregular surfaces, such, for instance, as the backs of chairs, or car-seats, &c., thus having a great advantage over wooden bars or backs. It is also less cumbrous, occupying but little space, and allows therefore more room for the spiral spring.

Figure 7:
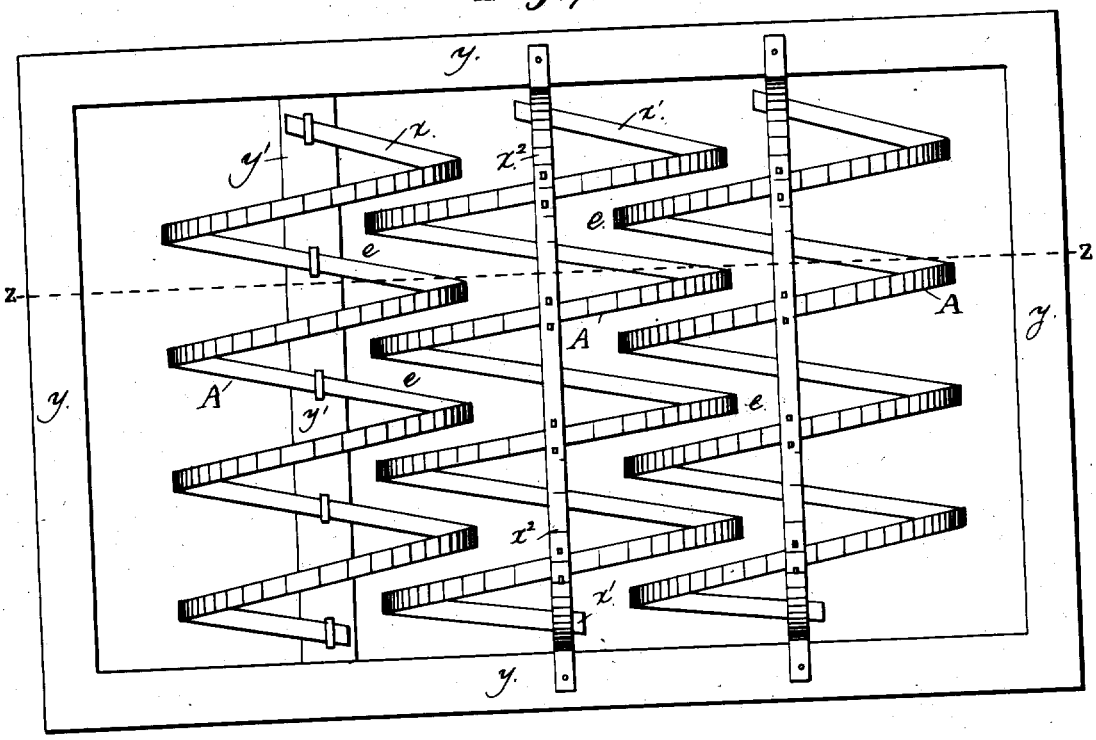
Figure 8:
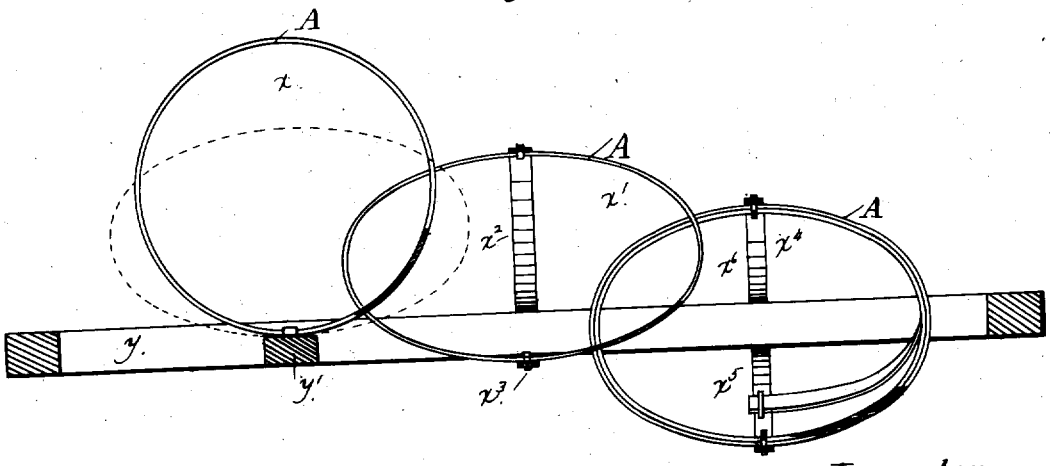

When two or more spirals are used, we prefer that the coils of next adjacent ones shall interspace each with the other, as seen at *e* in Figs. 5 and 6, and in Figs. 7 and 8.

The spiral spring has a capacity in proportion to the diameter of the circle into which it is bent or coiled. The power or weight which compresses the spring acts always in a direction transversely of its length. In Figs. 7 and 8 $x$ is a coil uncompressed; $x^1$, a coil compressed and held down by an arched transverse metal strap, $x^2$, and supported on a straight strap, $x^3$. $x^4$ is a coil resting on an arched strap, $x^5$, and held down by an arched strap, $x^6$, $y$ representing a wooden frame, and $y'$ a wooden cross-beam. These different forms are shown in one frame to avoid multiplying the figures on the drawings.

We claim—

1. In combination, the metal strap, and the flat strip or strips of spring-tempered steel, spirally-bent, connected to each other substantially as shown and described.

2. The combination, with a spirally-bent flat strip or strips, of two metal steadying bars or straps, the bars or straps being placed at opposite sides of the coiled strip, and fastened at each coil to said strip, substantially as shown and described.

JESSE L. BRANSON.
AUGUST JUERGENS.

Witnesses:
GUSTAV TAFEL,
CHARLES WEBER.